United States Patent [19]

Nakamura et al.

[11] Patent Number: 5,726,878
[45] Date of Patent: Mar. 10, 1998

[54] PREDICTION CONTROLLER

[75] Inventors: Hiroshi Nakamura; Kazuhiro Tsuruta, both of Kitakyushu, Japan

[73] Assignee: Kabushiki Kaisha Yaskawa Denki, Fukuoka, Japan

[21] Appl. No.: 571,844

[22] PCT Filed: Jul. 12, 1994

[86] PCT No.: PCT/JP94/01137

§ 371 Date: Dec. 26, 1995

§ 102(e) Date: Dec. 26, 1995

[87] PCT Pub. No.: WO95/02854

PCT Pub. Date: Jan. 26, 1995

[30] Foreign Application Priority Data

Jul. 14, 1993 [JP] Japan .................. 5-197956

[51] Int. Cl.$^6$ .................................. G05B 13/02
[52] U.S. Cl. ................. 364/164; 364/132; 364/187; 395/187
[58] Field of Search ................... 364/164, 132, 364/187; 395/587; 386/111; 65/163

[56] References Cited

U.S. PATENT DOCUMENTS

| | | | |
|---|---|---|---|
| 4,615,723 | 10/1986 | Rodriguez-Fernandez et al. | 65/163 |
| 4,931,879 | 6/1990 | Koga et al. | 386/111 |
| 5,369,345 | 11/1994 | Phan et al. | 318/561 |
| 5,463,746 | 10/1995 | Brodnax et al. | 395/587 |

FOREIGN PATENT DOCUMENTS

| | | |
|---|---|---|
| 62-118406 | 5/1987 | Japan . |
| 527829 | 2/1993 | Japan . |
| 535309 | 2/1993 | Japan . |
| 5165504 | 7/1993 | Japan . |
| 5173602 | 7/1993 | Japan . |

*Primary Examiner*—Reba I. Elmore
*Assistant Examiner*—McDieunel Marc
*Attorney, Agent, or Firm*—Jordan and Hamburg

[57] ABSTRACT

There is provided a prediction controller which requires a small amount of memory and a small amount of calculation performed in each sampling period and which can cope with a delay in the detection of an output to be controlled.

In a prediction controller wherein the output of an object to be controlled whose transfer function model is $$Gp(z)=(b_1 z^{-1}+ \ldots +b_{Nb} z^{-Nb})/\{(1-z^{-1})(1-a_1 z^{-1}- \ldots -a_{Na} z^{-Na})\}$$

is brought into agreement with a target command by inputting an increment $\Delta r(i+M)$ for the target command at the M-th sampling in the future and an increment $\Delta y(i-K)$ for the output of the object to be controlled at the K-th sampling ($K \geq 0$) in the past and by outputting a control input $v(i)$ to the object to be controlled at the current point in time i, the present invention includes a means for storing the increment of the target command, constants for prediction control, the increment of the past output, and control input in the past, a means for obtaining a deviation $e(i-K)$ from the increment of the target command and the increment of the output of the object to be controlled, and a means for determining the control input $v(i)$ at the current point in time.

4 Claims, 1 Drawing Sheet

PREDICTION CONTROLLER

The present invention relates to a controller for machine tools, robots, etc.

The applicant has proposed a prediction control technique in Japanese unexamined patent publication No. Hei-3-203882 (Japanese examined patent publication No. Hei-5-27829). According to this technique, the first several step responses of an object to be controlled are sampled and control inputs are determined so that a predicted deviation is minimized, using a model which is an approximation obtained on the assumption that the increment will be attenuated at a constant ratio.

Prediction control techniques utilizing a transfer function model of an object to be controlled include that described by Hashimoto, Kuroyanagi, and Harashima in "Prediction Control of Servo Systems Utilizing DSP", p. 990–996 of Bulletin D No. 9, the Institute of Electrical Engineers, 1990, and that described by Tamura, Nishitani, and Kunugida in "Model Prediction Control of Integral Processes" p. 367, Vol. 56 of the Memoir of Annual Lecture Meeting of Chemical Industries Association, 1991.

The technique disclosed in Japanese unexamined patent publication No. Hei-3-203882 requires step responses from an object to be controlled to predict future deviations. The step responses may be calculated by means of simulation if a transfer function model of the object to be controlled is available. However, this process is indirect and involves corresponding time and labor.

The technique proposed by Hashimoto et al. wherein a transfer function model is directly used to predict a deviation has had problems in that a great deal of calculation is involved in measuring the control input performed in each sampling period; since the performance criterion does not include the term of control input, the range for prediction must be large to keep the degree of correction low, which further increases the amount of calculation; since a target command, output, and control input are used as they are, the data has a large bit length which requires a large memory and significant calculation; and there is no way to deal with a delay in the detection of the output to be controlled.

The technique proposed by Tamura et al. has had problems in that it involves matrix calculations of higher orders, including inverse matrix calculations, when the model is at a high order or the range for prediction is large; since a target command, output, and control input are used as they are, the data has a large bit length which requires a large memory and a lot of calculation; and there is no way to deal with a delay in the detection of the output to be controlled.

SUMMARY OF THE INVENTION

It is an object of the present invention to provide a predictive controller which requires only a small amount of memory and minimal calculation during each sampling period, and which can cope with a delay in the detection of the output to be controlled.

In a prediction controller wherein the output of an object to be controlled has a transfer function model of $$Gp(z)=(b_1 z^{-1}+\ldots +b_{Nb} z^{-Nb})/\{(1-z^{-1})(1-a_1 z^{-1}-\ldots -a_{Na} z^{-Na})\}$$

and is brought into agreement with a target command by inputting an increment $\Delta r(i+M)$ for the target command at the M-th sampling in the future and an increment $\Delta y(i-K)$ as an output from the object to be controlled at the K-th sampling ($K \geq 0$) in the past representation of an actual displacement and by outputting a control input $v(i)$ to the object to be controlled at the current point in time i, characterized in that it includes a means for storing the increment for the target command, constants for prediction control, the increment for the past output, and control input in the past, a means for obtaining a deviation $e(i-K)$ from the increment for the target command and the increment for the output of the object to be controlled, and a means for determining the control input $v(i)$ at the current point in time from:

$$v(i) = \sum_{m=-K+1}^{M} v_m \Delta r(i+m) - \sum_{n=0}^{N_a-1} p_n \Delta y(i-K-n) + Ee(i-K) - \sum_{n=1}^{N_b+K-1} g_n v(i-n)$$

where vm, pn, E, and gn are constants for prediction control.

The above-described means make it possible to provide a prediction controller which requires only a small amount of memory and minimal calculation during each sampling period and which can cope with a delay in the detection of an output to be controlled, thereby allowing follow-up operations of higher accuracy.

DETAILED DESCRIPTION OF

Figure 1:
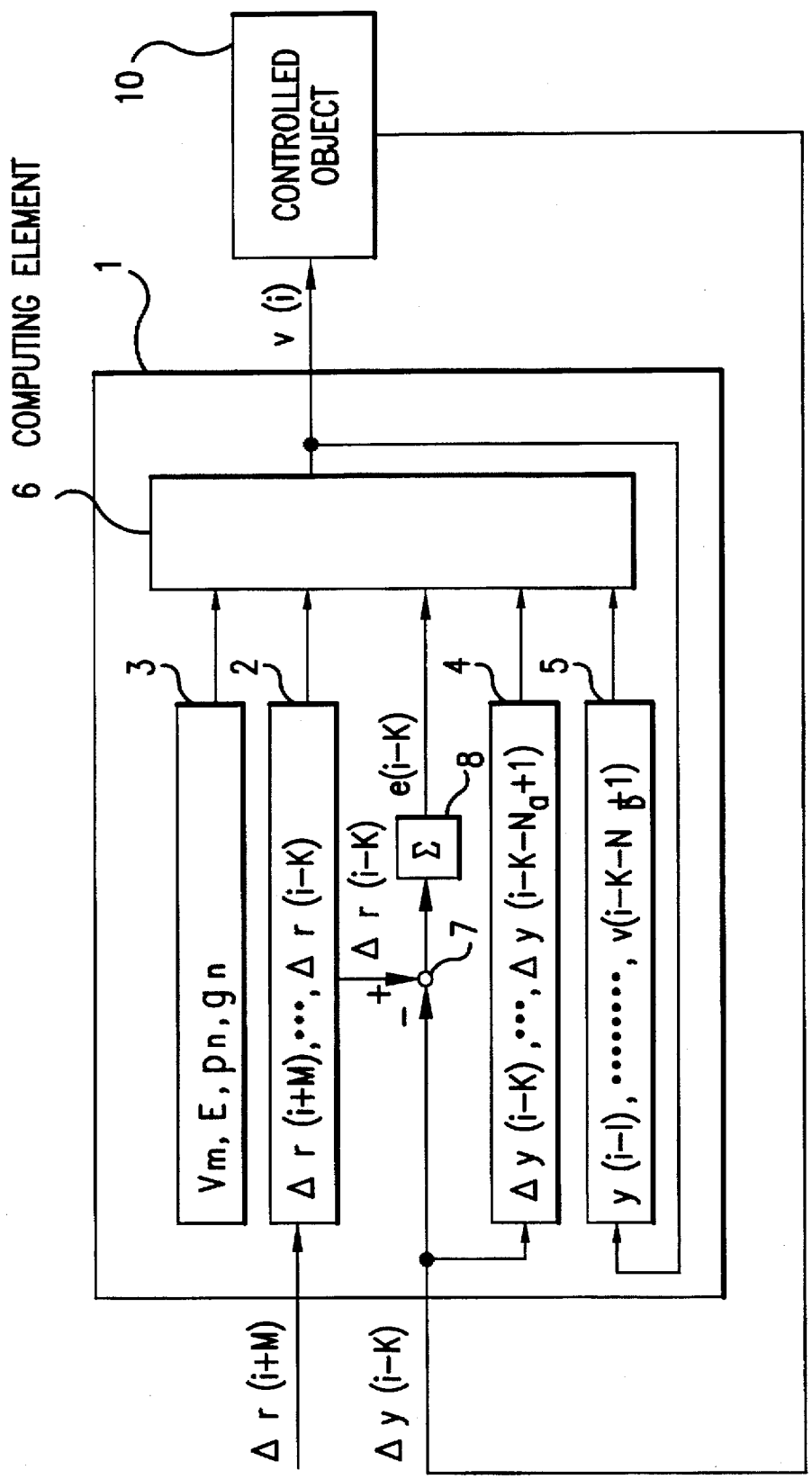
FIGURE 1 shows a specific embodiment of the present invention.

A specific embodiment of the present invention will now be described with reference to FIGURE 1. In this figure, 1 designates a prediction controller according to the present invention wherein an increment $\Delta r(i+M)$ for the target command in the future and an increment $\Delta y(i-K)$ for the output of the object to be controlled in the K-th sampling ($K \geq 0$) in the past are input and a control input $v(i)$ is output to controlled object 10, that is, the object to be controlled at the current point in time i; 2 designates a memory for storing increments for the target command $\Delta r(i-K), \ldots, \Delta r(i+M)$; 3 designates a memory for storing constants $E, v_{-K+1}, \ldots, v_M, p_0, \ldots, p_{Na-1}, g_1, \ldots, g_{Nb+K-1}$; 4 designates a memory for storing increments for output $\Delta y(i-K), \ldots, \Delta y(i-K-Na+1)$; 5 designates a memory for control inputs in the past $v(i-1), \ldots, v(i-K-Nb+1)$; 7 designates a subtracter for obtaining a difference $\Delta e(i-K)$ between the increment of the target command $\Delta r(i-K)$ stored in the memory 2 and the increment for the output $\Delta y(i-K)$ of the controlled object 10; 8 designates an integrator for obtaining $e(i-K)$ from $\Delta e(i-K)$; and 6 designates a computing element which computes the control input $v(i)$ through a calculation:

$$v(i) = \sum_{m=-K+1}^{M} v_m \Delta r(i+m) - \sum_{n=0}^{N_a-1} p_n \Delta y(i-K-n) + Ee(i-K) - \sum_{n=1}^{N_b+K-1} g_n v(i-n) \quad (1)$$

The calculated $v(i)$ is stored in the memory 5 and is output to the controlled object 10 as an output of the prediction controller 1.

Equation (1) is now derived. Assume that the transfer function of the controlled object 10 is given in a discrete time system expressed by:

$$Gp(z)=(b_1 z^{-1}+\ldots +b_{Nb} z^{-Nb})/\{(1-z^{-1})(1-a_1 z^{-1}-\ldots -a_{Na} z^{-Na})\}$$

Then, a model for the increments of the input and output thereof is given by the following equation.

$$\Delta \hat{y}(i) = \sum_{n=1}^{N_a} a_n \Delta \hat{y}(i-n) + \sum_{n=1}^{N_b} b_n v(i-n) \quad (2)$$

where $\Delta$ represents an increment of the sampling period.

Since an actual measured value $\Delta y(i-n)(n \geq K)$ for the increment of the output until a point in time i−K has been obtained from the controlled object 10 at the current point in time i, subsequent increments of the output are predicted using the actual measured value as follows.

$$\Delta y^*(i-K+1) = \sum_{n=1}^{N_a} a_n \Delta y(i-K+1-n) + \sum_{n=1}^{N_b} b_n v(i-K+1-n) \quad m=-k+1 \quad (3a)$$

$$\Delta y^*(i+m) = \sum_{n=1}^{m+k-1} a_n \Delta y^*(i+m-n) + \sum_{n=m+K}^{N_a} a_n \Delta y(i+m-n) + \sum_{n=1}^{N_b} b_n v(i+m-n) \quad m > -K+1 \quad (3b)$$

Then, a predicted value $\Delta y^*(i+m)$ of the increment of the output is given by the following equation.

$$\Delta y^*(i+m) = \sum_{n=K}^{N_a+K-1} A_{mn} \Delta y(i-n) + \sum_{n=0}^{N_b+K-1} B_{mn} v(i-n) \quad m \geq -K+1 \quad (4)$$

The coefficients Amn and Bmn are given by the following equations, where a control input in future is expressed by v(j)=0(j>i).

$$A_{(-K+1)n} = a_{(n-K+1)} \quad m=-K+1, K \leq n \leq N_a + K-1 \quad (5a)$$

$$A_{mn} = \sum_{j=1}^{m+K-1} a_j A_{(m-j)n} + a_{(n+m)} \quad m > -K+1, K \leq n \leq N_a + K-1 \quad (5b)$$

$$B_{(-K+1)n} = b_{(n-k+1)} \quad m=-K+1, 0 \leq n \leq N_b + K-1 \quad (6a)$$

$$B_{mn} = \sum_{j=1}^{m+K-1} a_j B_{(m-j)n} + b_{(n+m)} \quad m > -K+1, 0 \leq n \leq N_b + K-1 \quad (6b)$$

$$(a_n = 0(n > Na), b_n = 0(n < 1 \text{ and } n > Nb))$$

Bm0 in Equation (6b) is developed into the following equation where v(j)=v(i)(j>i).

$$\left. \begin{array}{l} B_{m0} = 0 \quad -K+1 < m \leq 0 \\ B_{m0} = \sum_{j=1}^{m+K-1} a_j B_{(m-j)0} + \sum_{j=1}^{m} b_j \quad m \geq 1 \end{array} \right\} \quad (6b')$$

A predicted value e*(i+m) for a deviation in the future is given by:

$$e^*(i+m) = \sum_{s=-K+1}^{m} \{\Delta r(i+s) - \Delta y^*(i+s)\} + e(i-K) \quad 1 \leq m \leq M \quad (7)$$

The control input v(i) is determined to minimize an performance criterion:

$$J = \sum_{m=1}^{M} w_m \{e^*(i+m) + \alpha e(i-K)\}^2 + c\{v(i)\}^2 + c_d \{\Delta v(i)\}^2 \quad (8)$$

Then, the above-described Equation (1) is obtained from $\partial J/\partial v(i)=0$. The constants vm, pn, E, and gn are given by the following equations.

$$\left. \begin{array}{ll} \beta_s = \sum_{j=1}^{s} B_{j0}, \quad W = \sum_{s=1}^{M} W_s \beta_s^2 + c + c_d, & q_s = W_s \beta_s / W \\ v_m = \sum_{S=m}^{M} q_s & m=-K+1, -K+2, \ldots, M \\ E = (1+\alpha)v_1 & \\ p_n = \sum_{m=-K+1}^{M} v_m A_{m(n+k)} & n=0, 1, \ldots, N_a - 1 \\ g_1 = \sum_{m=-K+1}^{M} v_m B_{m1} - c_d/W & n=1 \\ g_n = \sum_{m=-K+1}^{M} v_m B_{mn} & n=2, \ldots, N_b + K - 1 \end{array} \right\} \quad (9)$$

Equation (1) can be rewritten as follows using the increment $\Delta v$ of the control input:

$$v(i) = \sum_{m=-K+1}^{M} v_m \Delta r(i+m) - \sum_{n=0}^{N_a-1} p_n \Delta y(i-K-n) + \quad (1')$$

$$Ee(i-k) - G_1 v(i-1) + \sum_{n=1}^{N_b+K-2} G_{n+1} \Delta v(i-n)$$

where Gn is given by the following equation from gn in Equation (9):

$$G_n = \sum_{j=n}^{N_b+K-1} g_j \quad n=1, 2, \ldots, N_b + K - 1 \quad (9')$$

The present invention can be used for controlling object such as machine tools, robots, etc.

We claim:

1. A predictive controller for controlling a controlled object wherein the controlled object has a transfer function model defined by $$Gp(z) = (b_1 z^{-1} + \ldots + b_{Nb} z^{-Nb})/\{(1-z^{-1})(1-a_1 z^{-1} - \ldots - a_{Na} z^{-Na})\},$$

is responsive to control inputs and outputs measured displacement increments of said controlled object, the predictive controller comprising:

means for inputting target command increments including an increment $\Delta r(i+M)$ as a target command at an M-th sampling in the future;

means for inputting said measured displacement increments of said controlled object which are output by said controlled object including an increment $\Delta y(i-K)$ representing a measured physical displacement of the controlled object at a K-th sampling (K≥0) in the past;

means for outputting said control inputs to the controlled object wherein a control input v(i) is output to the controlled object at a current point in time i to instruct the controlled object to execute a physical displacement;

memory means for storing the target command increments, constants for prediction control, the measured displacement increments, and the control inputs which have been output to the controlled object;

a means for obtaining a deviation e(i–K) from the target command increments and the measured displacement increments of the controlled object;

means for determining the control input v(i) at the current point in time from:

$$v(i) = \sum_{m=-K+1}^{M} v_m \Delta r(i+m) - \sum_{n=0}^{N_a-1} p_n \Delta y(i-K-n) +$$

$$Ee(i-K) - \sum_{n=1}^{N_b+K-1} g_n v(i-n)$$

where $v_m$, $p_n$, E, and $g_n$ are constants for prediction control.

2. A predictive controller for controlling a controlled object wherein the controlled object has a transfer function model defined by $$Gp(z)=(b_1 z^{-1}+\ldots +b_{Nb} z^{-Nb})/\{(1-z^{-1})(1-a_1 z^{-1}-\ldots -a_{Na} z^{-Na})\},$$

is responsive to control inputs and outputs measured displacement increments of said controlled object, the predictive controller comprising:

means for inputting target command increments including an increment Δr(i+M) as a target command at an M-th sampling in the future;

means for inputting said measured displacement increments of said controlled object which are output by said controlled object including an increment Δy(i–K) representing a measured physical displacement of the controlled object at a K-th sampling (K≥0) in the past;

means for outputting said control inputs to the controlled object wherein a control input v(i) is output to the controlled object at a current point in time i to instruct the controlled object to execute a physical displacement;

first memory means for storing the target command increments, constants for prediction control, the measured displacement increments, and the control inputs which have been output to the controlled object;

means for obtaining a deviation e(i–K) from the target command increments and the measured displacement increments of the controlled object;

said memory means further storing increments of the control inputs which have been output to the controlled object; and a means for determining the control input v(i) at the current point in time from:

$$v(i) = \sum_{m=-K+1}^{M} v_m \Delta r(i+m) - \sum_{N=0}^{N_a-1} p_n \Delta y(i-K-n) +$$

$$Ee(i-K) - G_1 v(i-1) + \sum_{n=1}^{N_b+K-2} G_{n+1} \Delta v(i-n)$$

where $v_m$, $p_n$, E, and $G_n$ are constants for prediction control.

3. A predictively controlled apparatus comprising:

a controlled object responsive to control inputs for effecting physical displacements by said controlled object wherein the controlled object has a transfer function model defined by $$Gp(z)=(b_1 z^{-1}+\ldots +b_{Nb} z^{-Nb})/\{(1-z^{-1})(1-a_1 z^{-1}-\ldots -a_{Na} z^{-Na})\}$$

and said controlled object including means for outputting measured displacement increments of said controlled object; and a predictive controller comprising:

means for inputting target command increments including an increment Δr(i+M) as a target command at an M-th sampling in the future;

means for inputting said measured displacement increments of said controlled object which are output by said controlled object including an increment Δy(i–K) representing a measured physical displacement of the controlled object at a K-th sampling (K≥0) in the past;

means for outputting said control inputs to the controlled object wherein a control input v(i) is output to the controlled object at a current point in time i to instruct the controlled object to execute a physical displacement;

memory means for storing the target command increments, constants for prediction control, the measured displacement increments, and the control inputs which have been output to the controlled object;

a means for obtaining a deviation e(i–K) from the target command increments and the measured displacement increments of the controlled object;

means for determining the control input v(i) at the current point in time from:

$$v(i) = \sum_{m=-K+1}^{M} v_m \Delta r(i+m) - \sum_{n=0}^{N_a-1} p_n \Delta y(i-K-n) +$$

$$Ee(i-K) - \sum_{n=1}^{N_b+K-1} g_n v(i-n)$$

where $v_m$, $p_n$, E, and $g_n$ are constants for prediction control.

4. A predictively controlled apparatus comprising:

a controlled object responsive to control inputs for effecting physical displacements by said controlled object wherein the controlled object has a transfer function model defined by $$Gp(z)=(b_1 z^{-1}+\ldots +b_{Nb} z^{-Nb})/\{(1-z^{-1})(1-a_1 z^{-1}-\ldots -a_{Na} z^{-Na})\},$$

and said controlled object including means for outputting measured displacement increments of said controlled object; and a predictive controller comprising:

means for inputting target command increments including an increment Δr(i+M) as a target command at an M-th sampling in the future;

means for inputting said measured displacement increments of said controlled object which are output by said controlled object including an increment Δy(i–K) representing a measured physical displacement of the controlled object at a K-th sampling (K≥0) in the past;

means for outputting said control inputs to the controlled object wherein a control input v(i) is output to the controlled object at a current point in time i to instruct the controlled object to execute a physical displacement;

first memory means for storing the target command increments, constants for prediction control, the measured displacement increments, and the control inputs which have been output to the controlled object;

means for obtaining a deviation $e(i-K)$ from the target command increments and the measured displacement increments of the controlled object;

said memory means further storing increments of the control inputs which have been output to the controlled object; and a means for determining the control input $v(i)$ at the current point in time from:

$$v(i) = \sum_{m=-K+1}^{M} v_m \Delta r(i+m) - \sum_{N=0}^{N_a-1} p_n \Delta y(i-K-n) + Ee(i-K) - G_1 v(i-1) + \sum_{n=1}^{N_b+K-2} G_{n+1} \Delta v(i-n)$$

where $v_m$, $p_n$, $E$, and $G_n$ are constants for prediction control.

* * * * *